(12) United States Patent
Eisele et al.

(10) Patent No.: US 8,752,525 B2
(45) Date of Patent: Jun. 17, 2014

(54) FLAP DEVICE AND INTAKE SYSTEM

(75) Inventors: Marc Eisele, Stuttgart (DE); Ivano Morgillo, Neuhütten (DE)

(73) Assignee: Mahle International GmbH (DE)

( * ) Notice: Subject to any disclaimer, the term of this patent is extended or adjusted under 35 U.S.C. 154(b) by 18 days.

(21) Appl. No.: 13/511,319

(22) PCT Filed: Nov. 18, 2010

(86) PCT No.: PCT/EP2010/067733
§ 371 (c)(1),
(2), (4) Date: Aug. 13, 2012

(87) PCT Pub. No.: WO2011/061247
PCT Pub. Date: May 26, 2011

(65) Prior Publication Data
US 2012/0312275 A1   Dec. 13, 2012

(30) Foreign Application Priority Data
Nov. 23, 2009   (DE) .................. 10 2009 054 184

(51) Int. Cl.
*F02D 9/10*   (2006.01)
(52) U.S. Cl.
USPC ............................ 123/336; 123/337; 251/304
(58) Field of Classification Search
USPC .................................. 123/336, 337; 251/304
See application file for complete search history.

(56) References Cited

U.S. PATENT DOCUMENTS

| | | | |
|---|---|---|---|
| 5,696,318 A | 12/1997 | Ernst et al. | |
| 6,400,141 B1 | 6/2002 | Apel et al. | |
| 7,980,219 B2 | 7/2011 | Sano et al. | |
| 8,056,534 B2 * | 11/2011 | Magnan et al. | 123/336 |
| 8,327,824 B2 * | 12/2012 | Takeda et al. | 123/306 |
| 8,387,581 B2 * | 3/2013 | Goldin et al. | 123/184.55 |
| 2002/0175308 A1 * | 11/2002 | Leyendecker et al. | 251/305 |

(Continued)

FOREIGN PATENT DOCUMENTS

| DE | 29901516 U1 | 4/1999 |
|---|---|---|
| DE | 69505763 T2 | 7/1999 |

(Continued)

OTHER PUBLICATIONS

English abstract for DE-69505763, Jul. 1, 1999.

(Continued)

*Primary Examiner* — Erick Solis
(74) *Attorney, Agent, or Firm* — Rader, Fishman & Grauer PLLC

(57) ABSTRACT

A valve device for an intake system of an internal combustion engine may include a housing and a flap arrangement. The housing may have one inlet duct per cylinder of the internal combustion engine. The flap arrangement may have a flap for each inlet duct for varying the cross-section of the respective inlet duct through which a flow can pass. The respective flap may be a trough-shaped flap having a curved stirrup region. The respective flap may be arranged between the stirrup ends eccentrically with respect to a flap pivot axis. The flap arrangement may have a common actuating shaft for the common pivoting of the flaps about the flap pivot axis. The actuating shaft may be coupled with an adjusting drive via a lever element having a metallic insert and a plastic body injected onto the insert.

20 Claims, 7 Drawing Sheets

(56) References Cited

U.S. PATENT DOCUMENTS

| | | | |
|---|---|---|---|
| 2003/0034001 A1 | 2/2003 | Herold et al. | |
| 2007/0044754 A1* | 3/2007 | Peffley et al. | 123/306 |
| 2007/0084437 A1* | 4/2007 | Winkelmuller et al. | 123/336 |
| 2007/0256662 A1* | 11/2007 | Confer et al. | 123/308 |
| 2008/0035107 A1* | 2/2008 | Torii | 123/336 |
| 2008/0271697 A1* | 11/2008 | Vichinsky | 123/184.56 |
| 2012/0312275 A1* | 12/2012 | Eisele et al. | 123/336 |

FOREIGN PATENT DOCUMENTS

| | | |
|---|---|---|
| DE | 19946861 A1 | 4/2001 |
| DE | 10140314 A1 | 2/2003 |
| DE | 102004045730 B3 | 3/2006 |
| DE | 102005029798 A1 | 1/2007 |
| DE | 102008040177 A1 | 1/2009 |
| EP | 0726388 A1 | 1/1996 |
| EP | 1024267 A2 | 8/2000 |
| EP | 1884636 A1 | 2/2008 |
| JP | 08-068606 | 3/1996 |
| JP | 2002-070587 A | 3/2002 |
| JP | 2004-285893 A | 10/2004 |
| JP | 2004-361119 A | 12/2004 |
| WO | WO-2006/024468 A1 | 3/2006 |

OTHER PUBLICATIONS

English abstract for DE-102004045730, Mar. 16, 2006.
English abstract for DE-102005029798, Jan. 4, 2007.
English abstract for DE-19946861, Apr. 19, 2001.
English abstract for JP2004-285893.
English abstract for JP2002-70587.
English translation of Japanese Office Action for JP-2012-540365, dated Oct. 22, 2013.
English Translation of Japanese Advisory Action mailed Mar. 11, 2014.
English abstract for JP 2004-361119.

* cited by examiner

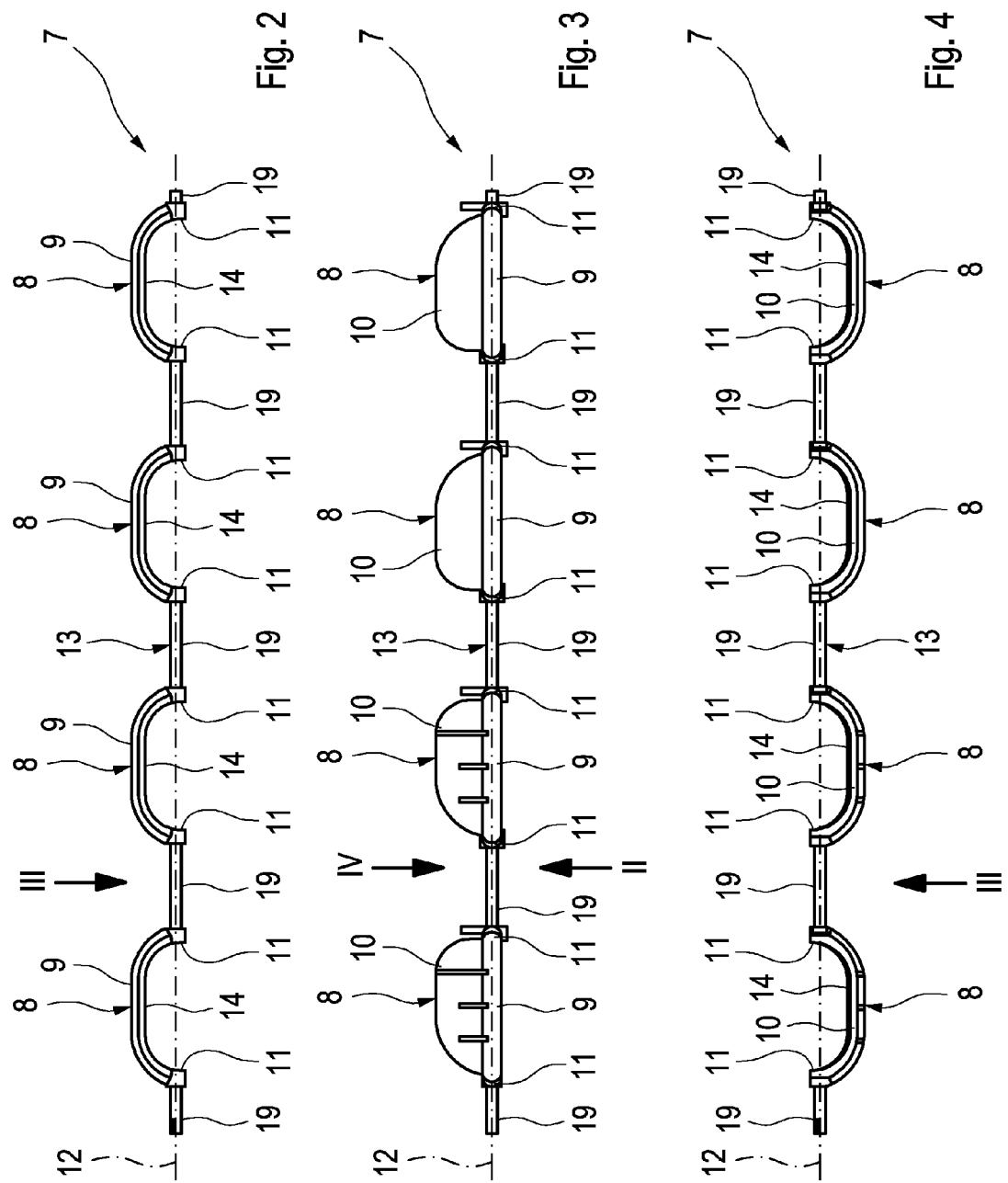

FLAP DEVICE AND INTAKE SYSTEM

CROSS-REFERENCE TO RELATED APPLICATIONS

This application claims priority to German Patent Application 10 2009 054 184.5 filed on Nov. 23, 2009 and PCT/EP2010/06773 filed on Nov. 18, 2010, which are hereby incorporated by reference in their entireties.

TECHNICAL FIELD

The present invention relates to a flap device for an intake system of an internal combustion engine, in particular of a motor vehicle, with the features of the introductory clause of Claim 1. The invention also relates to an intake system equipped with such a flap device.

BACKGROUND

A flap device of the type named in the introduction is known from DE 199 46 861 A1. The flap device has a housing which has precisely one inlet duct for each cylinder of the internal combustion engine. In addition, the flap device has a flap arrangement which has for each inlet duct a flap for varying the cross-section of the respective inlet duct through which a flow can pass.

In the known flap device, all the flaps together form an integral body in a single piece, which undertakes at the same time the function of the actuating shaft. The individual flaps in this flap device are configured as butterfly flaps, which are arranged centrally with respect to the flap pivot axis.

From EP 0 726 388 A1 another flap device is known, in which the housing for each cylinder of the internal combustion engine has two inlet ducts, wherein the flap arrangement has a flap for varying the cross-section through which a flow can pass only for every other inlet duct. For the actuation of the flaps, a common actuating shaft is provided, on which the individual flaps are arranged. For this, the actuating shaft has for each flap a projection on which the respective flap is arranged, whereby a favourable torque transmission is produced between the actuating shaft and the flap.

In the known flap device, the flaps can be configured as butterfly flaps arranged centrally with respect to the flap pivot axis or as flaps formed eccentrically with respect to the flap pivot axis, projecting from the integral actuating shaft.

SUMMARY

The present invention is concerned with the problem of indicating for a flap device of the type named in the introduction or respectively for an intake system equipped therewith an improved or at least a different embodiment, which is distinguished in particular in that the flap arrangement operates with a comparatively high precision, wherein in addition the manufacturing costs are to be comparatively low. Alternatively or additionally, in the open position of the respective flap the influence on the air flow is to be reduced.

This problem is solved according to the invention by the subjects of the independent claims. Advantageous embodiments are the subject of the dependent claims.

The invention is based on the general idea of designing the flaps as trough-shaped flaps, which are characterized by a curved stirrup region and a shell region projecting therefrom, wherein for actuation of all the flaps a common actuating shaft is provided, which has for each flap a projection which is situated in the stirrup region in the case of the respective flap. The use of a common actuating shaft on which the individual flaps are arranged makes possible the use of different materials for the actuating shaft on the one hand and the flaps on the other hand. In particular, the flaps can be injection-moulded from plastic, whilst the actuating shaft can be produced from metal. Hereby, a secure and reliable actuation of the flaps can be realized. Injection-moulded parts can be produced with close tolerances, whereby the flap device can operate with a comparatively high precision. The metallic actuating shaft can be cast or forged or can also be produced in a particularly simple manner by deformation of a wire. The actuating shaft is preferably designed as a single-piece, continuous shaft, into which the projections for the flaps are formed. The flaps can be produced so that they can be clippable onto the actuating shaft; alternatively, it is also possible to inject the flaps directly onto the actuating shaft. The type of construction with flaps injected onto the common actuating shaft has the advantage that dimensional deviations due to tolerance, which can occur in the production of the actuating shaft, can be eliminated during the injecting-on of the flaps. Thereby, the flap device has a very small misalignment. Furthermore, this composite component can be produced at a particularly favourable cost.

In an advantageous further development of the invention, the flaps can be arranged in cascades on the actuating shaft. Here, the flaps are fixed on the actuating shaft, being are rotated with respect to each other by a few degrees (e.g. less than 10° or less than 5°). The arrangement of the flaps is selected such that the flap which is arranged furthest away from the drive of the actuating shaft in the installed state comes to abut as the first one. The flap arranged nearest to the drive comes to abut as the last one. The remaining flaps are arranged with their angle of inclination accordingly between these two flaps. Through this further development, it is ensured that all the flaps come to abut reliably against the intake manifold and each flap has approximately the same pre-stressing. This has the advantage that torsional vibrations are prevented and the intake manifold has improved acoustic characteristics. The arrangement of the flaps on the actuating shaft, or respectively the angle of inclination which is to be provided, is dependent on the torsion characteristics of the actuating shaft. In the case of more rigid shafts, smaller angles of inclination are necessary than in the case of more flexible shafts.

According to an advantageous embodiment, the flaps and the inlet ducts can be coordinated with each other so that the respective flap extends in its open position with its stirrup region and with its shell region along an inner wall of the respective inlet duct. Through this type of construction, the flap in its open position, in which it is therefore not required, is largely moved laterally out from the cross-section of the respective inlet duct through which a flow can pass. Hereby, the influence of the opened flap on the through-flow of the inlet duct can be reduced.

According to an advantageous further development, the respective inlet duct can have on its inner wall a depression into which the flap at least partially dips in its open position at least with a section lying between the stirrup ends. Through this provision, the influence of the opened and not required flap on the flow conditions in the inlet duct can be again reduced.

A further reduction of the flow influence of the opened flap can be realized according to a further development in that the flap in its open position terminates flush with the inner wall on the inflow side with its section dipping into the depression. Through this provision, the contour of the flap which is exposed to the flow adjoins the contour of the inner wall of the inlet duct, which reduces the influence of the opened flap on the through-flow of the inlet duct.

According to another advantageous embodiment, the shell region of the respective flap can be adapted in the open position of the flap to the contour of the inner wall. This provision also contributes to a further reduction of the interaction between the opened flap and the flow in the inlet duct.

According to an advantageous further development, the adaptation of the flap to the contour of the inner wall can be realized such that the shell region extends the contour of the inner wall in the flow direction. In this way, the opened flap does not form a flow obstruction in the shell region, whereby the interaction with the movement of air in the inlet duct is again reduced.

According to another advantageous embodiment, the respective shell region can be configured asymmetrically. Hereby it can be achieved in particular that the flap in its closed position within the associated inlet duct realizes sections with cross-sections of different size through which a flow can pass. By targeted configuration of the asymmetry it is possible, furthermore, to generate a swirl flow or a tumble flow in the closed position of the respective flap. A further development is particularly advantageous here in which a first section of the shell region in a closed position of the respective flap comes to abut against a wall of the inlet duct, whilst a second section of the shell region in the closed position of the respective flap is spaced apart from the wall. This can be utilized for generating a defined inlet flow into the respective cylinder.

Further important features and advantages of the invention will emerge from the subclaims, from the drawings and from the associated figure description with the aid of the drawings.

It shall be understood that the features mentioned above and to be explained in further detail below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically

FIG. 2 a side view of a flap arrangement in accordance with a viewing direction II in FIG. 3, FIG. 3 a side view of the flap arrangement in a viewing direction III according to FIGS. 2 and 4, FIG. 4 a side view of the flap arrangement in a viewing direction IV according to FIG. 3, FIG. 5 a sectional view of the flap device in the region of an inlet duct, FIG. 6 a sectional view as in FIG. 5, but with a different flap position, FIG. 7 a perspective view of a lever element, FIG. 8 a perspective view of an insert of the lever element, FIG. 9 a side view of the insert, but in a different embodiment, FIG. 10 a perspective view in the region of a coupling between an actuating shaft and a rotation angle sensor, FIG. 11 a perspective view of a housing of the flap device in the region of a front face with the rotation angle sensor, but in a different embodiment, FIG. 12 a highly simplified sectional view of the flap device in the region of a coupling between the flap arrangement and the rotation angle sensor, FIG. 13 a perspective view of an intake system with the flap device, FIG. 14 a sectional view of the flap device in an alternative design of the sensor region, FIG. 15 a top view onto the flap device in the sensor region according to FIG. 14.

DETAILED DESCRIPTION

Figure 12:
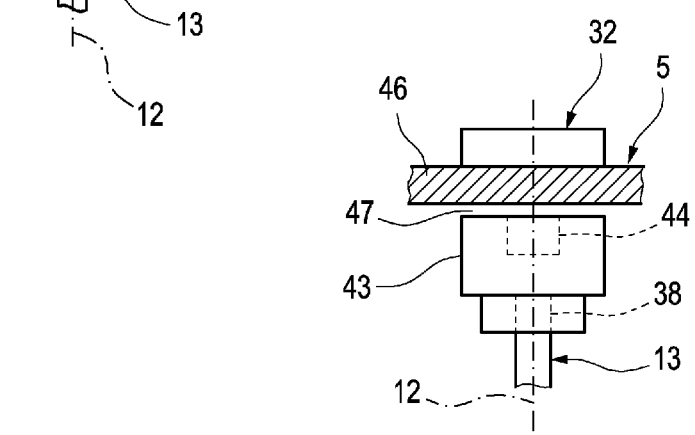
Figure 13:
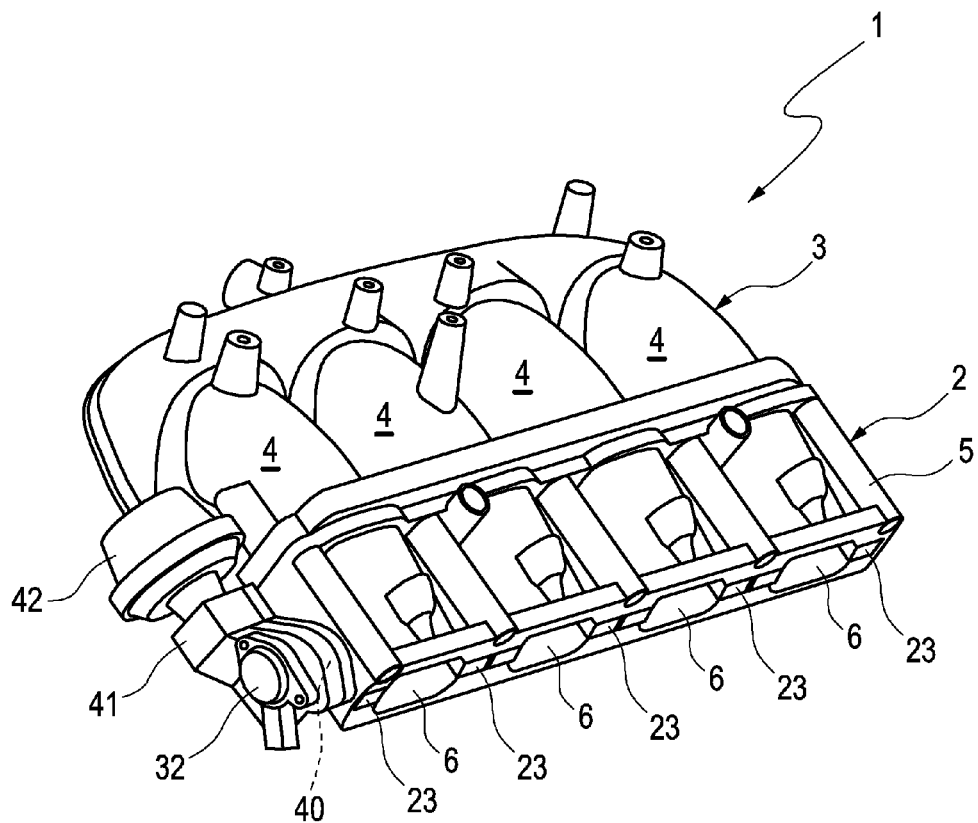

In accordance with FIGS. 1 to 15, an intake system 1, which can only be seen in FIG. 13, comprises a flap device 2 for connection to an internal combustion engine, not shown here, which can be arranged in particular in a motor vehicle. The intake system 1 serves for the supply of air of the internal combustion engine, which is configured as a piston engine and has several cylinders. In the example which is shown, the intake system 1 has in addition a fresh air distributor 3, which has several inlet pipes 4. In the embodiments shown here, the flap device 2 is designed as an intermediate flap, which in the mounted state is arranged between the fresh air distributor 3 and the internal combustion engine. In particular, the flap device 2 can form a completely pre-mountable unit, which is able to be pre-mounted independently of the remaining intake system 1. In other embodiments, the intake system 1 can be embodied as a single-piece component, in which the function of the intermediate flange is integrated and the flap device 2 is introduced directly into a housing of the intake system 1.

According to other embodiments, the intermediate flange can also be connected with other air supply units, such as e.g. compressors or air distributors with or without a cooler, and can form an intake system.

In accordance with FIGS. 1 to 15, the flap device 2 comprises a housing 5, which has precisely one inlet duct 6 per cylinder of the internal combustion engine. In the example which is shown, the housing 5 is equipped with four inlet ducts 6. The flap device 2 can therefore be configured for an in-line four cylinder engine or else for a bank of a V-8 cylinder engine. The cylinder number or respectively the number of inlet ducts 6 is, however, purely by way of example here.

In particular embodiments, the duct in the intake manifold can be single-flow, i.e. an individual duct can be provided per cylinder. In other embodiments, two ducts can be provided per cylinder; the duct is therefore embodied as a double-flow duct. The continuation of the single-flow or double-flow duct in the intermediate flange can likewise be configured so as to be single-flow or double-flow. In the cylinder-head itself, the duct can likewise be embodied so as to be single-flow or double-flow. Here, the number of ducts in the cylinder-head is dependent on the number of valves. Through the different combination of single-flow or respectively double-flow ducts arranged one after the other, particular flows, such as e.g. swirl flows and/or tumble flows, can be generated, which enable an optimum filling of the cylinders.

The flap device 2 comprises in addition a flap arrangement 7. This has a single flap 8 for each inlet duct 6. The flaps 8 serve to vary the cross-section of the respective inlet duct 6 through which a flow can pass. In accordance with FIGS. 1 to 6, the flaps 8 are designed here as trough-shaped flaps. Such a trough-shaped flap 8 is characterized on the one hand by a curved stirrup region 9 and on the other hand by a shell region 10 projecting from the stirrup region 9. The respective stirrup region 9 has two stirrup ends 11 spaced apart from each other, which are arranged respectively coaxially with respect to a flap pivot axis 12. The stirrup region 9 projects out from the flap pivot axis 12 between the stirrup ends 11. Through these projections, the respective flap 8 is arranged between the stirrup ends 11 eccentrically with respect to the flap pivot axis 12.

The flap arrangement 7 has for all flaps 8 a common actuating shaft 8, by means of which the flaps 8 can be pivoted jointly about the flap pivot axis 12. For each flap 8, the actuating shaft 13 has a projection 14 with respect to the flap pivot axis 12. In the region of these projections 14, the actuating shaft 13 therefore runs eccentrically with respect to the flap pivot axis 12. The individual flaps 8 are now arranged in the region of the projections 8 on the actuating shaft 13. The arrangement of the flaps 8 on the actuating shaft 13 takes place here expediently so that the respective flap 8 is arranged with its stirrup region 9 along the respective projection 14. In accordance with FIGS. 5 and 6, the flaps 8 and the inlet ducts 6 can be expediently coordinated with each other so that the respective flap 8, in an open position shown in FIG. 6, extends with its stirrup region 9 and with its shell region 10 along an inner wall 15 of the respective inlet duct 6. The respective flap 8 can extend here such that or respectively so closely along the inner wall 15 that a flowing around the flap between the inner wall 15 and the shell region 10 is not possible or is largely ruled out.

Figure 5:
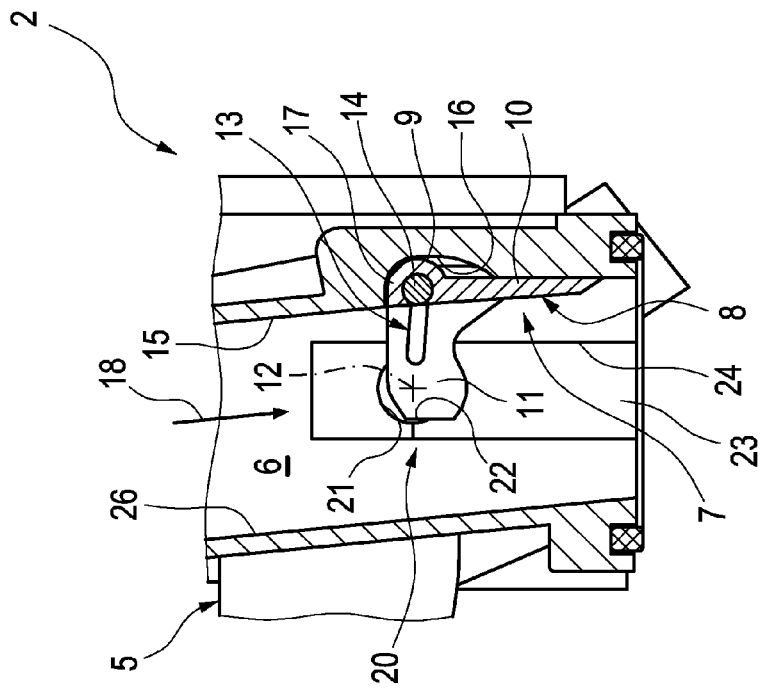
Figure 6:
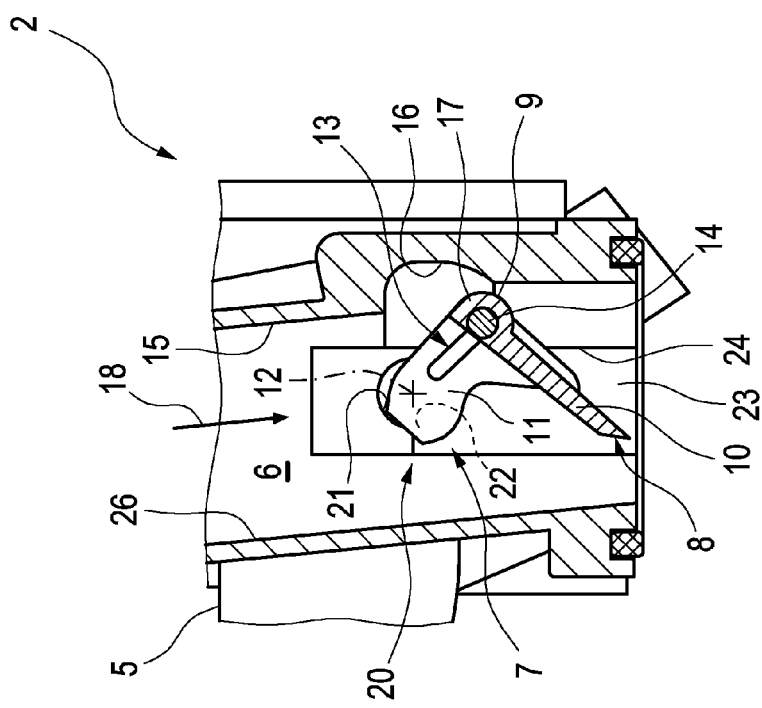

In the embodiments shown here, the inlet duct 6 is equipped on its inner wall 15 with a depression 16. The latter is dimensioned and positioned so that the flap 8, in its open position, at least partially dips into this depression 16 with a section lying between the stirrup ends 11. The embodiment shown here is particularly advantageous in which the flaps 8 and the inlet ducts 6 and the depressions 16 are coordinated with each other so that the flap 8, in its open position according to FIG. 6, terminates flush with the inner wall 15 on the inflow side with its section 17 dipping into the depression 16. In FIGS. 5 and 6 a flow direction 18 is indicated by an arrow, in which the inlet duct 6 guides the fresh air to the associated cylinder. As can be seen, the flap 8 terminates flush with the inner wall 15 on the inflow side in the region of the depression 16.

It can also be seen from FIG. 6 that the shell region 10, in the preferred embodiment shown here, is adapted in the open position to the contour of the inner wall 15, and namely preferably such that the shell region 10 extends the contour of the inner wall 15 in the flow direction 18. Hereby, a low-resistance transition is created between the inner wall 15 and the flap 8, whereby it is possible to guide the fresh air flow in the open position to the respective cylinder, largely without interaction with the flap 8.

The individual flaps 8 can basically be produced independently of the actuating shaft 13. They can be clipped onto the actuating shaft 13 or connected with the actuating shaft 13 in another manner. However, an embodiment is preferred in which the flaps 8 are injected onto the actuating shaft 13. Here, the actuating shaft 13 is preferably made from metal, whereas the flaps 8 are injection-moulded from plastic. On injecting the flaps 8 onto the actuating shaft 13, for example manufacturing tolerances of the actuating shaft 13 can be compensated.

Figure 1:
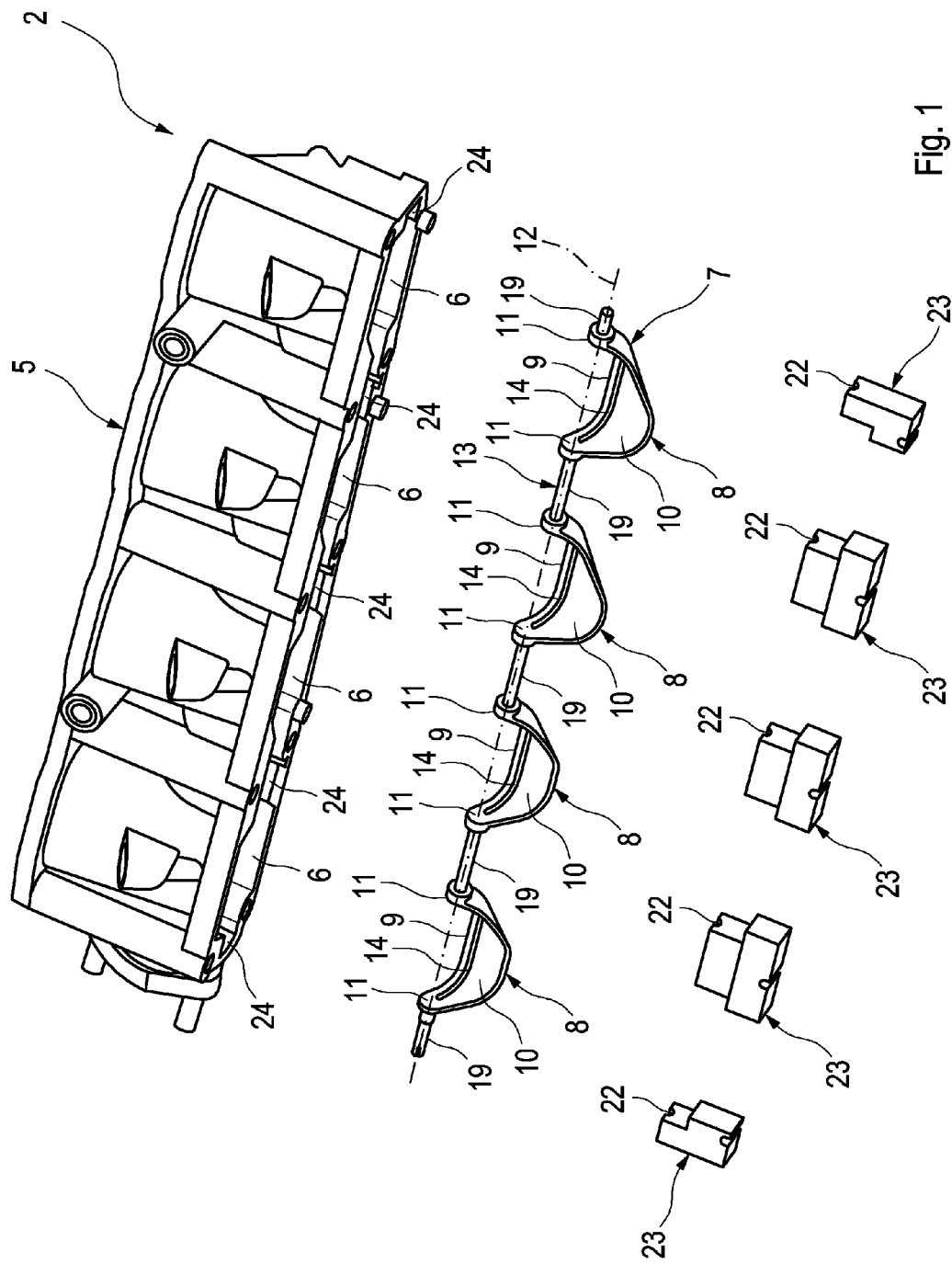
FIG. 1 a perspective, exploded view of a flap device.

As can be seen in particular from FIGS. 1, 5 and 6, the flaps 8 can be injected onto the actuating shaft 13 so that the actuating shaft 13 in the region of its projection 14 is only partially surrounded by the flap material. Likewise, a full injecting around of the projections 14 by the material of the flap 8 is conceivable, for example in order to achieve a particularly high-quality adaptation of the flap 8 or respectively of the shell region 10 to the contour of the inner wall 15.

In accordance with FIGS. 1 to 4, the actuating shaft 13 can have a straight bearing region 19 on both sides of each flap 8. Expediently, common bearing regions 19 are provided here between adjacent flaps 8. In accordance with FIGS. 1, 5 and 6, the housing 5 has several bearings 20. In these bearings 20, the bearing regions 19 of the actuating shaft 13 are pivotably arranged about the flap pivot axis 12. These bearings 20 can preferably be realized here in that respectively a first bearing half shell 21 is integrally formed on the housing 5, whilst a second bearing half shell 22 complementary thereto is formed integrally on a bearing part 23, which is mounted in a suitable manner onto the housing 5. For example, these bearing parts 23 are inserted into corresponding bearing part mounts 24 which are constructed on the housing 5. By the fastening of the housing 5 on the internal combustion engine, automatically a sufficient fixing of the bearing parts 23 on the housing 5 is then brought about. Likewise, it is possible to glue and/or jam the bearing parts 23 with the housing 5, i.e. to fix them by friction fit or force fit.

Figure 7:
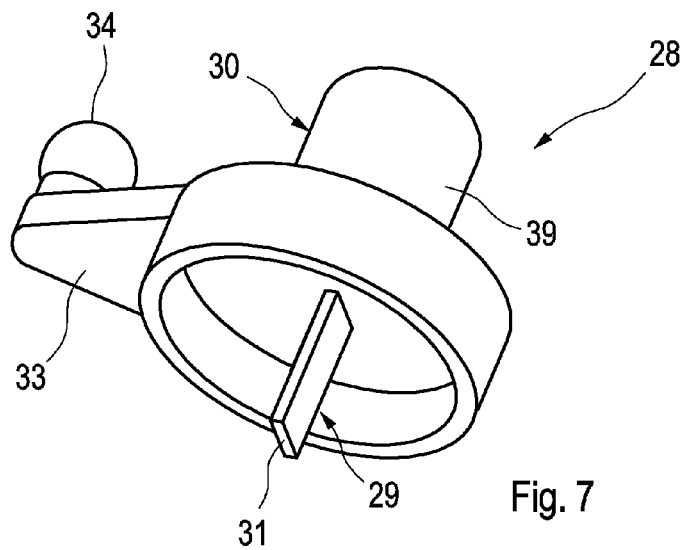

FIG. 7 shows a lever element 28, by means of which the actuating shaft 13 can be coupled with an adjusting drive 42 which can be seen in FIG. 13. The adjusting drive 42 introduces a torque here into the lever element 28 with respect to the flap pivot axis 12, wherein the lever element 28 transfers this torque to the actuating shaft 13.

The embodiment which is shown here is particularly advantageous in which the lever element 28 has a metallic insert 29 and a body 30 of plastic, which is injected onto the insert 29. In the example of FIG. 7, the insert 29 projects with an actuating section 31 out from the plastic body 30. In accordance with FIG. 10, the lever element 28 can cooperate with this actuating section 31 with a rotation angle sensor 32, which can be designed in particular as a Hall sensor. The rotation angle sensor 32 can detect the relative rotation position of the actuating shaft 13 and hence of the flap arrangement 7.

Figure 10:
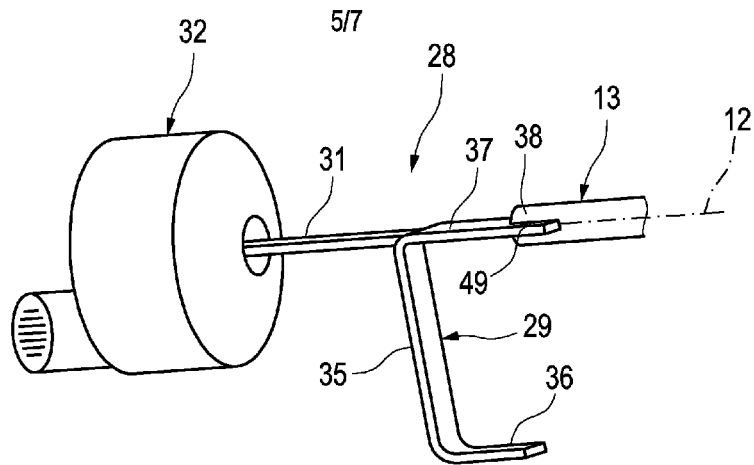

In the example of FIG. 7, the lever element 28 has a lever arm 33, which can be coupled for example via a ball head 34 with the adjusting drive 42 for the introduction of torque. Matching this, the insert 29 has a lever arm section 35, which extends inside the lever arm 33. The lever arm section 35 can have an angled end section 36, which extends inside the ball head 34. Opposite the actuating section 31, the insert 29 has a coupling section 37 here, which projects with respect to the actuating section 31 over the plastic body 30 and which in accordance with FIG. 10 projects into an end 38 of the actuating shaft 13, which is slotted for this, in order to thus be able to transfer torque to the actuating shaft 13. In FIG. 10, to better illustrate the function of the insert 29, the plastic body 30 of the lever element 28 is omitted. The slot for receiving the coupling section 37 is designated by 49.

In accordance with FIG. 7 a circular-cylindrical bearing section 39 can be formed on the plastic body 30, by means of which the lever element 28 can be mounted on the housing 5 so as to be rotatable about the flap pivot axis 12. For this, the housing 5 can be equipped with a bearing mount 40 formed in a complementary manner with respect to the bearing section 39, which bearing mount can be arranged on the front face of the bearing housing 5. In the embodiment shown in FIG. 13, the said bearing mount 40 is concealed by an additional housing 41, in which the lever element 28 is accommodated and in which the coupling with the adjusting drive 42 takes place, which in FIG. 13 is designed, by way of example, as a pressure cell. The rotation angle sensor 32 is mounted onto this additional housing 41.

Figure 8:
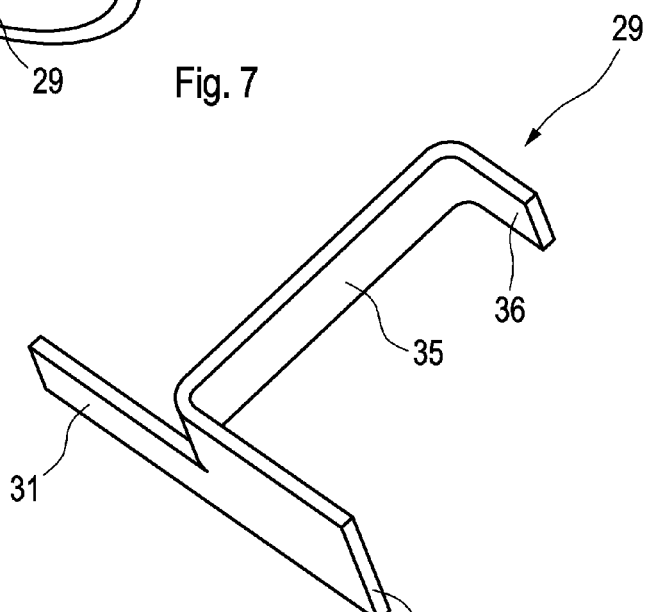
Figure 9:
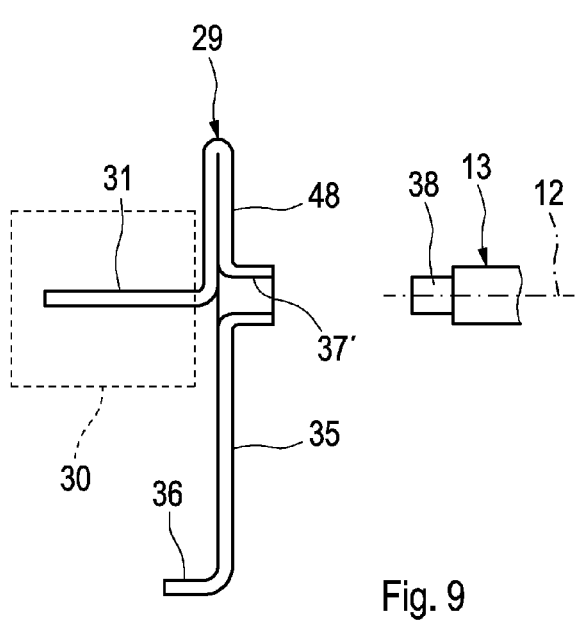

In contrast to FIG. 8, FIG. 9 shows a different embodiment for realizing such an insert 29, which differs from the insert according to FIG. 8 by a modified coupling section 37' and by a double-folded section 48. Whereas in the embodiment shown in FIG. 8 the coupling section 37 is designed so as to be flat, in order to be able to engage according to FIG. 10 into the mounting slot 49 at the front end 38 of the actuating shaft 13, the coupling section 37' in the embodiment shown in FIG. 9 is designed as a multi-sided mount. In a complementary manner thereto, the end 38 of the actuating shaft 13 on the front face is formed as a polygon, for example as a square. The double-folded section 48 extends the lever arm section 35 beyond the coupling section 37' and thereby improves the torque introduction into the plastic body 30.

Figure 11:
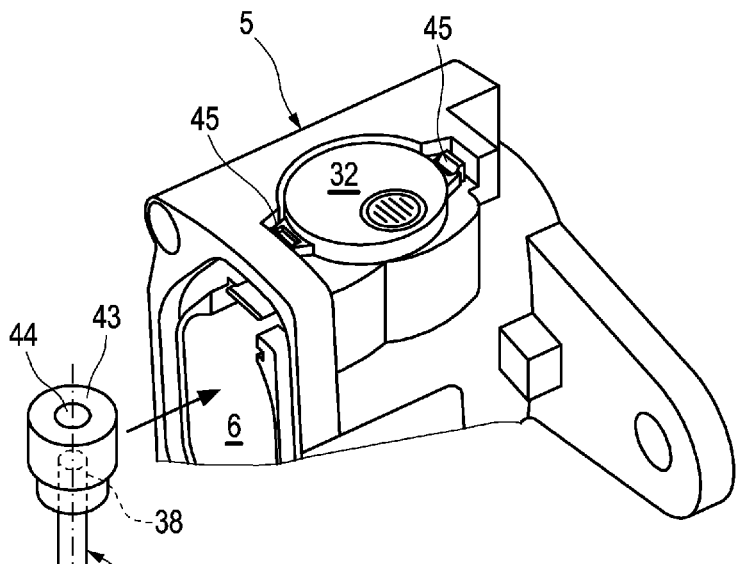

FIGS. 11 and 12 show a different embodiment, in which the actuating shaft 13, represented outside the housing 5 for illustration in FIG. 11, carries a magnet carrier 43 in a rotatably fixed manner. The said magnet carrier 43, in turn, carries a permanent magnet 44 in a rotatably fixed manner. The magnet carrier 43 is arranged expediently at an end 38 of the actuating shaft 13 on the front face. In the mounted state, the permanent magnet 44 cooperates in a contact-free manner with a correspondingly configured rotation angle sensor 32, which again can be designed in particular as a Hall sensor. The embodiment presented here is particularly advantageous, in which the housing 5 according to FIG. 12 has a wall section 46 between the permanent magnet 44 and the rotation angle sensor 32. In other words, the permanent magnet 44 is arranged in the interior of the housing 5, whilst the rotation angle sensor 32 is arranged externally on the housing 5. Hereby, no separate sealing of the housing 5 has to be provided in the region of the rotation angle sensor 32. In addition, it can be seen from FIG. 12 that the magnet carrier 43 keeps the permanent magnet 44 spaced apart axially from the wall section 46 with respect to the flap pivot axis 12, so that a gap 47 is produced axially between the wall section 46 and the magnet carrier 43 or respectively the permanent magnet 44.

In the example which is shown, the rotation angle sensor 32 is fastened particularly simply on the housing 5, namely by a clipping arrangement. For this, clip elements 45 on the housing side can be formed integrally on the housing 5, whereby the fastening of the rotation angle sensor 32 on the housing 5 is able to be realized in a comparatively favourably priced manner.

Figure 14:
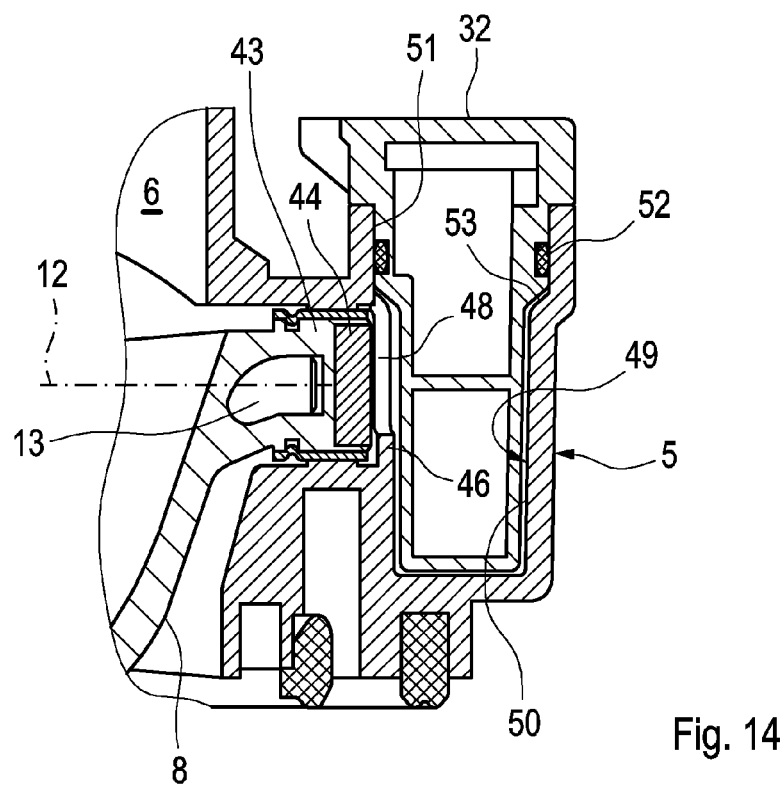
Figure 15:
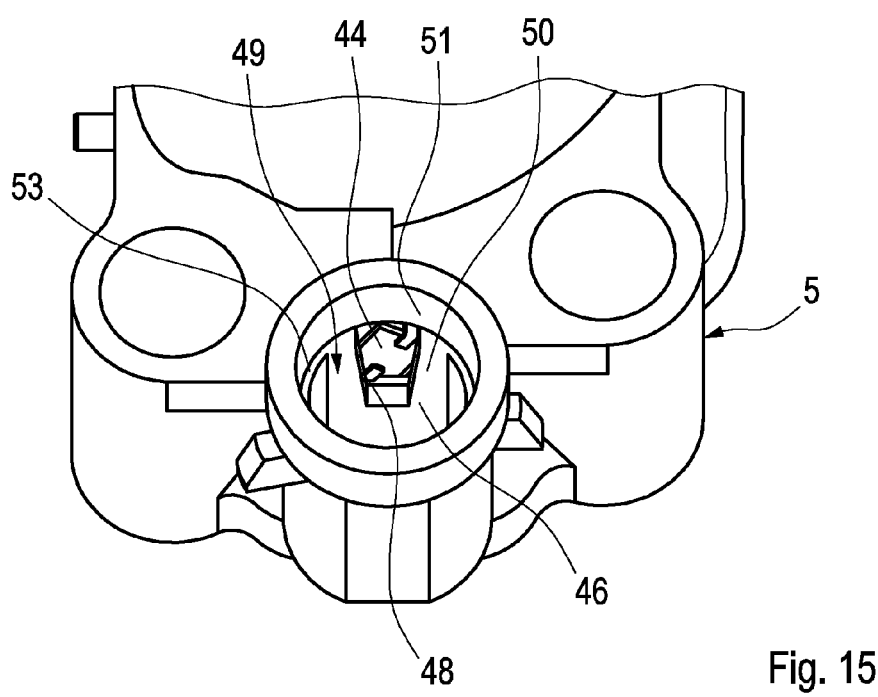

In FIG. 14 an alternative embodiment of the sensor region is illustrated in section. FIG. 15 shows the sensor region according to FIG. 14, without sensor 32, in top view. In contrast to the sensor region illustrated in FIG. 12, the wall section 46 has a wall aperture 48. This wall aperture 48 is arranged in the region of the detection range of the sensor 32. Through this wall aperture 48, no sealing separation exists between the shaft end with the permanent magnet 44 and the sensor 32. Through the arrangement of the wall aperture 48, the magnetic field of the magnet 44 is transferred directly to the sensor 32. Therefore, materials can be used for the housing 5 or respectively for the entire intake system 1, which are magnetically or respectively electrically conductive, without the magnetic field being influenced. Preferably, electrically conductive plastics can be used. The wall aperture 48 can have any desired geometries, such as e.g. round, oval, rectangular or square. In the present example embodiment, the wall aperture 48 is designed in a V shape, wherein the wall aperture 48 becomes larger in the mould release direction. Therefore, a mould release slider can be simply drawn away upwards. Furthermore, in this embodiment the sensor 32 is arranged in a sensor mount 49, which has a conically constructed receiving space 50 and a sealing region 51. The wall aperture 48 is arranged in the region of the receiving space 50. The sealing region 51 is designed such that a seal 52, which in this example embodiment is configured as an O-ring seal, forms a seal between the sensor mount 49 and the sensor 32 and thus the interior of the inlet ducts 6 is sealed with respect to the environment. The receiving space 50 has a smaller cross-section than the sealing region 51. Therefore, a shoulder 53 is formed between the receiving space 50 and the sealing region 51. The wall aperture 48 extends from this shoulder 53 in the direction of the receiving space 50. Therefore, the wall aperture 48 is able to be removed from the mould simply. In this example embodiment, cropped flaps 8 according to FIGS. 2 to 4 are integrated into the inlet ducts 6. In other embodiments, the arrangement may, however, also have a flap shaft embodied in a straight line and flaps arranged thereon, with or without projection regions. Of course, different combinations of single-flow and double-flow ducts can also be provided, as described above.

The invention claimed is:

1. A valve device for an intake system of an internal combustion engine, comprising:
    a housing having one inlet duct per cylinder of the internal combustion engine,
    a flap arrangement having a flap for each inlet duct for varying the cross-section of the respective inlet duct through which a flow can pass,
    wherein the respective flap is a trough-shaped flap having a curved stirrup region and a shell region projecting therefrom,
    wherein the respective stirrup region has two stirrup ends spaced apart from each other and arranged coaxially with respect to the flap pivot axis,
    wherein the respective flap is arranged between the stirrup ends eccentrically with respect to the flap pivot axis,
    wherein the flap arrangement has a common actuating shaft for the common pivoting of the flaps about the flap pivot axis,
    wherein the actuating shaft has a projection for each flap,
    wherein the respective flap is arranged with its stirrup region along the associated projection on the actuating shaft,
    wherein the actuating shaft is coupled with an adjusting drive via a lever element, and
    wherein the lever element has a metallic insert and a plastic body injected onto the insert.

2. The valve device according to claim 1,
    wherein the flaps and the inlet ducts are coordinated with each other so that the respective flap in its open position extends with its stirrup region and with its shell region along an inner wall of the respective inlet duct.

3. The valve device according to claim 2,
    wherein the respective inlet duct defines on its inner wall a depression in which the flap in its open position at least partially dips with a section lying between the stirrup ends, wherein the flap in its open position terminates flush with the inner wall on inflow side with its section dipping into the depression.

4. The valve device according to claim 2,
    wherein the shell region of the respective flap in the open position is adapted to the contour of the inner wall so that the shell region extends the contour of the inner wall in the flow direction.

5. The valve device according to claim 1,
    wherein the respective flap is injected onto the actuating shaft.

6. The valve device according to claim 1,
    wherein the actuating shaft has a straight bearing region on both sides of each flap, wherein the housing has a plurality of bearings, the bearing regions of the actuating shaft being mounted therein, wherein each bearing has a first bearing half shell formed integrally on the housing and a second bearing half shell formed on a bearing part mounted onto the housing.

7. The valve device according to claim 1, wherein the flap arrangement includes an adjusting drive for driving the actuating shaft, each flap being positioned proximally with respect to the adjusting device;

wherein adjacent flaps are arranged on the actuating shaft offset to each other with respect to the flap pivot axis by an angular difference, the angular difference increases with an increasing distance between each flap and the adjusting drive, wherein the angular differences of the flaps are coordinated with each other so that a flap positioned distally with respect to an adjusting drive for driving the actuating shaft on at least one of closing and opening of the flaps firstly comes to abut against a wall of the respective inlet duct and the other flaps succeeding in decreasing distances from the adjusting drive come to abut in succession against the respective wall of the respective inlet duct, and wherein the angular difference between adjacent flaps is at least one of a maximum 10°, a maximum 5° and a maximum 2°.

8. The valve device according to claim 1, wherein the insert projects out from the plastic body and cooperates with a rotation angle sensor to detect a rotation position of the flap arrangement.

9. The valve device according to claim 8, wherein the plastic body has a circular-cylindrical bearing section rotatably mounted about the flap pivot axis in a complementary bearing mount of the housing.

10. The valve device according to claim 1, wherein the actuating shaft carries a magnet carrier in a torque-proof manner and the magnet carrier carries a permanent magnet which cooperates with a rotation angle sensor for detection of a rotation position of the flap arrangement, wherein the housing has a wall section between the permanent magnet and the rotation angle sensor.

11. The valve device according to claim 1, wherein the housing is an intermediate flange, which is able to be mounted between the internal combustion engine and the remaining intake system.

12. An intake system for the fresh air supply of an internal combustion engine, comprising: at least one flap device having a housing and a flap arrangement, wherein the housing has one inlet duct per cylinder of the internal combustion engine, wherein the flap arrangement has a flap for each inlet duct for varying the cross-section of the respective inlet duct through which a flow can pass, wherein the respective flap is a trough-shaped flap having a curved stirrup region and a shell region projecting therefrom, wherein the respective stirrup region has two stirrup ends spaced apart from each other and arranged coaxially with respect to the flap pivot axis, wherein the respective flap is arranged between the stirrup ends eccentrically with respect to the flap pivot axis, wherein the flap arrangement has a common actuating shaft for the common pivoting of the flaps about the flap pivot axis, wherein the actuating shaft has a projection for each flap, wherein the respective flap is arranged with its stirrup region along the associated projection on the actuating shaft, wherein the actuating shaft is coupled with an adjusting drive via a lever element, and wherein the lever element has a metallic insert and a plastic body injected onto the insert.

13. The valve device according to claim 3, wherein the shell region of the respective flap in the open position is adapted to the contour of the inner wall so that the shell region extends the contour of the inner wall in the flow direction.

14. The valve device according to claim 13, wherein the respective flap is injected onto the actuating shaft.

15. The valve device according to claim 14, wherein the actuating shaft has a straight bearing region on both sides of each flap, wherein the housing has a plurality of bearings, the bearing regions of the actuating shaft being mounted therein, wherein each bearing has a first bearing half shell formed integrally on the housing and a second bearing half shell formed on a bearing part mounted onto the housing.

16. The valve device according to claim 15, wherein the flap arrangement includes an adjusting drive for driving the actuating shaft, each flap being positioned proximally with respect to the adjusting device;

wherein adjacent flaps are arranged on the actuating shaft offset to each other with respect to the flap pivot axis by an angular difference, the angular difference increasing with an increasing distance between each flap and the adjusting drive, wherein the angular differences of the flaps are coordinated with each other so that a flap positioned distally with respect to an adjusting drive for driving the actuating shaft on at least one of closing and opening of the flaps firstly comes to abut against a wall of the respective inlet duct and the other flaps succeeding in decreasing distances from the adjusting drive come to abut in succession against the respective wall of the respective inlet duct, and wherein the angular difference between adjacent flaps is at least one of a maximum 10°, a maximum 5°, and a maximum 2°.

17. The valve device according to claim 16, wherein the insert projects out from the plastic body and cooperates with a rotation angle sensor to detect a rotation position of the flap arrangement.

18. The valve device according to claim 17, wherein the plastic body has a circular-cylindrical bearing section rotatably mounted about the flap pivot axis in a complementary bearing mount of the housing.

19. The valve device according to claim 18, wherein the actuating shaft carries a magnet carrier in a torque-proof manner and the magnet carrier carries a permanent magnet which cooperates with a rotation angle sensor for detection of a rotation position of the flap arrangement, wherein the housing has a wall section between the permanent magnet and the rotation angle sensor.

20. The valve device according to claim 15, wherein the housing is an intermediate flange, which is able to be mounted between the internal combustion engine and the remaining intake system.

* * * * *